United States Patent
Dong et al.

(10) Patent No.: US 11,635,340 B2
(45) Date of Patent: Apr. 25, 2023

(54) LEAKAGE DETECTION SYSTEM AND METHOD FOR LONG PETROLEUM PIPELINE BASED ON AFPSO-K-MEANS

(71) Applicant: Northeast Petroleum University, Daqing (CN)

(72) Inventors: Hongli Dong, Daqing (CN); Chuang Wang, Daqing (CN); Yong Zhang, Daqing (CN); Yang Lu, Daqing (CN); Jingyi Lu, Daqing (CN); Fan Yang, Daqing (CN)

(73) Assignee: NORTHEAST PETROLEUM UNIVERSITY, Daqing (CN)

( * ) Notice: Subject to any disclaimer, the term of this patent is extended or adjusted under 35 U.S.C. 154(b) by 345 days.

(21) Appl. No.: 16/923,098

(22) Filed: Jul. 8, 2020

(65) Prior Publication Data
US 2021/0033484 A1   Feb. 4, 2021

(30) Foreign Application Priority Data
Jul. 31, 2019 (CN) .................. 201910703524.X (51) Int. Cl.
*G01M 3/22* (2006.01)
(52) U.S. Cl.
CPC ................... *G01M 3/22* (2013.01)
(58) Field of Classification Search
CPC ....................................................... G01M 3/22
See application file for complete search history.

(56) References Cited

U.S. PATENT DOCUMENTS

| | | | |
|---|---|---|---|
| 2010/0023307 A1* | 1/2010 | Lee | G06K 9/6226 703/7 |
| 2015/0106323 A1* | 4/2015 | Awotunde | G06N 3/006 706/52 |
| 2016/0125103 A1* | 5/2016 | Cracraft | G06F 30/20 703/2 |
| 2017/0255717 A1* | 9/2017 | Kumar | G06F 30/20 |
| 2018/0335363 A1* | 11/2018 | Aslam | G01N 15/06 |
| 2019/0251458 A1* | 8/2019 | Ravi | G06N 5/003 |
| 2020/0148395 A1* | 5/2020 | Zhang | G06N 20/10 |
| 2021/0010893 A1* | 1/2021 | Jiang | G05D 7/0635 |

\* cited by examiner

*Primary Examiner* — Kyle R Quigley
(74) *Attorney, Agent, or Firm* — Bayramoglu Law Offices LLC (57) ABSTRACT

A leakage detection method for a long petroleum pipeline based on AFPSO-K-means includes: initializing a particle swarm, and defining an initial velocity and an initial position of each particle in the particle swarm; determining a fitness value of the each particle; traversing the fitness value of the each particle to obtain an optimal position corresponding to the fitness value of the each particle and a global optimal position in optimal fitness values of the particle swarm; iteratively updating a velocity and a position of the each particle based on the optimal position corresponding to the fitness value of the each particle; and when a distance from the position of the each particle to the global optimal position is less than a preset threshold or a number of iterations reaches a preset value, outputting a current iteration updated result to determine an actual leakage position of the petroleum pipeline.

7 Claims, 5 Drawing Sheets

FIG. 5

LEAKAGE DETECTION SYSTEM AND METHOD FOR LONG PETROLEUM PIPELINE BASED ON AFPSO-K-MEANS

CROSS REFERENCE TO THE RELATED APPLICATIONS

This application is based upon and claims priority to Chinese Patent Application No. 201910703524.X, filed on Jul. 31, 2019, the entire contents of which are incorporated herein by reference.

TECHNICAL FIELD

The present invention belongs to the technical field of detection of long petroleum pipeline failure, and more particularly relates to a leakage detection system and method for a long petroleum pipeline based on AFPSO-K-means.

BACKGROUND

Petroleum is an important energy resource and raw material in daily life, industrial production, and military aerospace industry. Gasoline, asphalt, and other chemical products can be separated from petroleum and are widely used in people's daily lives. With rapid economic development, the demand for petroleum is increasing, and the transportation problem thereof is gradually noticed. As the most efficient, safest, and quickest mode of transportation, pipelines are widely used in the petroleum transportation industry. Currently, the total length of petroleum pipelines in China is $20 \times 10^4$ km. However, the aging of pipelines, natural disasters and petroleum theft have resulted in large petroleum leakage, seriously contaminating the environment and damaging human properties. Therefore, it is necessary to carry out regular inspection on the petroleum pipelines. Originally, inspection has been performed manually. However, manual inspection is not only inefficient and costly, but also infeasible in some dangerous areas. Therefore, some indirect detection methods are proposed such as negative pressure waves, small wave changes, etc., but most of them are not sufficiently accurate.

SUMMARY

In order to overcome the above disadvantages in the prior art, the present invention provides a leakage detection system and method for a long petroleum pipeline based on adaptive focusing particle swarm optimization (AFPSO)-K-means. The present invention is applied to detection of failure of long petroleum pipelines, which has the advantages of high accuracy, better real-time, easy operation and the like.

The present invention adopts the following technical solution.

A leakage detection method for a long petroleum pipeline based on AFPSO-K-means includes:

initializing a particle swarm, and defining an initial velocity and an initial position of each particle in the particle swarm;

determining a fitness value of each particle;

traversing the fitness value of each particle to obtain an optimal position corresponding to the fitness value of the each particle and a global optimal position in optimal fitness values of the particle swarm;

iteratively updating a velocity and a position of each particle based on the optimal position corresponding to the fitness value of the each particle; and when a distance from the position of each particle to the global optimal position in the optimal fitness values of the particle swarm is less than a preset threshold or the number of iterations reaches a preset value, outputting a current iteration updated result to determine an actual leakage position of the petroleum pipeline.

Preferably, the step of initializing the particle swarm and defining the initial velocity and the initial position of each particle in the particle swarm includes:

defining the number of sample points of the petroleum pipeline to be detected to be n, and constructing a data set of n sample points $x_i=(x_{i1}, x_{i2}, \ldots, x_{id})$; wherein $i=1, 2, \ldots, n$.

averagely dividing the data set to be clustered into k classes, wherein each class is one particle swarm;

randomly selecting the initial position and an initial velocity of the each particle in the particle swarm; and obtaining an individual extreme value and a global extreme value based on the initial position and the initial velocity of the each particle.

Further, the data set to be clustered is averagely divided into k classes by the following formula:

$$X = C_1 \cup \ldots \cup C_k \cup C_{outliers}$$

wherein, $C_1 \ldots C_k$ represents k classes, k represents the number of classes, $C_i \cap C_j = \emptyset$, and X represents the clustered data set.

Further, the fitness value of the each particle is determined by the following formula:

$$\sqrt{\sum_{i=1}^{d}(x_i - y_i)^2}$$

wherein, $x_i$ and $y_i$ represents two points in the d-dimensional Euclidean space, respectively.

Preferably, the step of traversing the fitness value of the each particle to obtain the optimal position corresponding to the fitness value of the each particle and the global optimal position in the optimal fitness values of the particle swarm includes:

taking a minimum mean square error as a clustering objective function, and solving the objective function to obtain a cluster center;

obtaining the optimal position corresponding to the fitness value of the each particle according to the cluster center; and obtaining the global optimal position in the optimal fitness values of the particle swarm by comparing the optimal fitness values of all particles.

Further, the cluster center is determined by the following formula:

$$MSE = \frac{1}{n}\sum_{j=1}^{k}\sum_{y_i \subseteq c_j} \|y_i - z_j\|^2$$

wherein, $y_i$ represents a fitness value of an $i^{th}$ particle, and $z_j$ represents the cluster center.

Further, the step of iteratively updating the velocity and the position of the each particle based on the optimal position corresponding to the fitness value of the individual particle includes:

comparing the fitness value of the each particle with the corresponding optimal position, and when the fitness value of the each particle converges to the corresponding optimal position, taking a fitness value of a current particle as the optimal position of the each particle;

updating a velocity of the current particle by the following formula:

$$v_i(k+1)=wv_i(k)+c_1r_1(p_i(k)-x_i(k))+c_2r_2(p_g(k)-x_i(k))$$

$$x_i(k+1)=x_i(k)+v_i(k+1)$$

wherein, $\|(p_i(k)-x_i(k))\|$ represents a distance between the fitness value $x_i(k)$ of the particle and the corresponding optimal position $p_i(k)$, and $v_i(k)=0$, $v_i(k)$ represents the velocity of the current particle at k moment.

Further, the step of outputting the current iteration updated result includes:

comparing the optimal positions of all the current individual particles with the global optimal position of the particle swarm, and when the optimal positions of all the individual particles reach the global optimal position, the optimal positions $p_{best}$ of the individual particles coincide with the global optimal position $g_{best}$, $p_{best}=g_{best}=x_i(k)$ and $v_i(k+1)=0$, $x(k+1)=x(k)$.

A leakage detection system for a long petroleum pipeline based on AFPSO-K-means, includes:

an initialization module, wherein the initialization module is configured to initialize a particle swarm and define an initial velocity and an initial position of each particle in the particle swarm;

a determination module, wherein the determination module is configured to determine a fitness value of the each particle;

a traversing module, wherein the traversing module is configured to traverse the fitness value of the each particle to obtain an optimal position corresponding to a fitness value of an individual particle and a global optimal position in optimal fitness values of the particle swarm;

an iteration updating module, wherein the iteration updating module is configured to iteratively update a velocity and a position of the each particle based on the optimal position corresponding to the fitness value of the each particle; and a position determining module, wherein when a distance from the position of each particle to the global optimal position in the optimal fitness values of the particle swarm is less than a preset threshold or the number of iterations reaches a preset value, the position determining module is configured to output a current iteration updated result to determine an actual leakage position of the petroleum pipeline.

Compared with the prior art, the present invention has the following advantages.

The present invention provides a leakage detection system and method for a long petroleum pipeline based on AFPSO-K-means, wherein AFPSO has a good optimization result and can effectively calculate the optimal value. The AFPSO algorithm optimizes the initial state of K-means to prevent falling into local optimization. The method includes the following specific steps: particle swarm is initialized, and the initial velocity and the initial position of each particle in the particle swarm is defined, and the fitness value of each particle is determined; the fitness value of each particle is traversed to obtain the optimal position corresponding to the fitness value of individual particle and the global optimal position in the optimal fitness values of the particle swarm; the velocity and the position of each particle is iteratively updated based on the optimal position corresponding to the fitness value of the individual particle; and when the distance from the position of each particle to the global optimal position in the optimal fitness values of the particle swarm is less than the preset threshold or the number of iterations reaches the preset value, the current iteration updated result is outputted to determine the actual leakage position of the petroleum pipeline. The present invention is suitable for leakage detection of petroleum pipeline, which has advantages such as high accuracy, good real-time performance and easy operation, and others.

DETAILED DESCRIPTION OF THE EMBODIMENTS

The embodiments of the present invention are further described in detail hereinafter in conjunction with the drawings.

Embodiment 1: the present invention provides a leakage detection method for a long petroleum pipeline based on AFPSO-K-means. AFPSO algorithm has a good optimization result and can effectively calculate the optimal value. The AFPSO algorithm is provided to optimize the initial state of K-means to avoid falling into local optimization.

Figure 1:
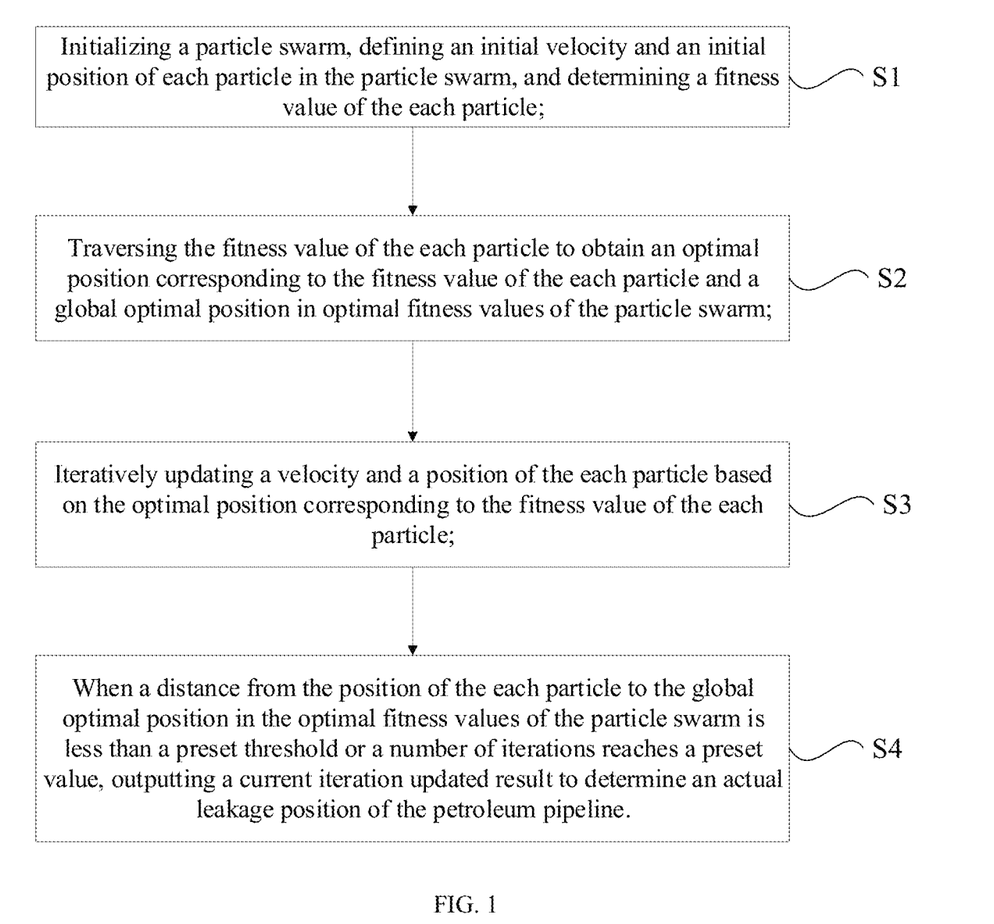
FIG. 1 is a flow chart of a leakage detection method for a long petroleum pipeline based on AFPSO-K-means according to an embodiment of the present invention.

As shown in FIG. 1, the present invention includes the following detailed steps.

S1: particle swarm is initialized, and the initial velocity and the initial position of each particle in the particle swarm is defined.

The fitness value of each particle is determined.

S2: the fitness value of each particle is traversed to obtain the optimal position corresponding to the fitness value of individual particle and the global optimal position in the optimal fitness values of the particle swarm.

S3: the velocity and the position of each particle is iteratively updated based on the optimal position corresponding to the fitness value of the individual particle.

S4: when the distance from the position of each particle to the global optimal position in the optimal fitness values of the particle swarm is less than the preset threshold or the number of iterations reaches the preset value, the current iteration updated result is outputted to determine the actual leakage position of the petroleum pipeline.

The step S1 of initializing the particle swarm and defining the initial velocity and the initial position of each particle in the particle swarm includes the following:

the number of sample points of the petroleum pipeline to be detected is defined as n, and a data set of n sample points $x_i=(x_{i1}, x_{i2}, \ldots x_{id})$ is constructed, wherein, i=1, 2, . . . , n;

the data set to be clustered is averagely divided into k classes, wherein each class is one particle swarm;

an initial position and the initial velocity of the each particle in the particle swarm is randomly selected; and individual extreme value and global extreme value are obtained based on the initial position and the initial velocity of the each particle.

Specifically, the data set to be clustered is averagely divided into k classes by the following formula:

$$X = C_1 \cup \ldots \cup C_k \cup C_{outliers}$$

wherein, $C_1 \ldots C_k$ represents k classes, k represents the number of classes, $C_i \cap C_j = \emptyset$, and X represents a clustered data set.

In step S1, the fitness value of each particle is determined by the following formula:

$$\sqrt{\sum_{i=1}^{d}(x_i - y_i)^2}$$

wherein, $x_i$ and $y_i$ represents two points in the d-dimensional Euclidean space, respectively.

The step S2 of traversing the fitness value of each particle to obtain the optimal position corresponding the fitness value of the individual particle and the global optimal position in the optimal fitness values of the particle swarm includes the following:

the minimum mean square error is taken as a clustering objective function, and the objective function is solved to obtain a cluster center;

the optimal position corresponding to the fitness value of the individual particle is obtained according to the cluster center; and the global optimal position in the optimal fitness values of the particle swarm is obtained by comparing the optimal fitness values of all particles.

The cluster center is determined by the following formula:

$$MSE = \frac{1}{n}\sum_{j=1}^{k}\sum_{y_i \subseteq c_j}\|y_i - z_j\|^2$$

wherein, $y_i$ represents the fitness value of the $i^{th}$ particle and $z_j$ represents the cluster center.

The step S3 of iteratively updating the velocity and the position of the each particle based on the optimal position corresponding to the fitness value of the individual particle includes the following:

the fitness value of each particle is compared with the corresponding optimal position, and when the fitness value of each particle converges to the corresponding optimal position, the fitness value of the current particle is taken as the optimal position of the each particle; and the velocity of the current particle is updated by the following formula:

$$v_i(k+1) = wv_i(k) + c_1 r_1(p_i(k) - x_i(k)) + c_2 r_2(p_g(k) - x_i(k))$$

$$x_i(k+1) = x_i(k) + v_i(k+1)$$

wherein, $\|(p_i(k) - x_i(k))\|$ represents a distance between the fitness value $x_i(k)$ of the particle and the corresponding optimal position $p_i(k)$, and $v_i(k) = 0$, $v_i(k)$ represents the velocity of the current particle at k moment.

The step S4 of outputting the current iteration updated result includes:

the optimal positions of all the current individual particles are compared with the global optimal position of the particle swarm, and when the optimal positions of all individual particles reach the global optimal position, the optimal positions $p_{best}$ of the individual particles coincide with the global optimal position $g_{best}$, $p_{best} = g_{best} = x_i(k)$ and $v_i(k+1) = 0$, $x(k+1) = x(k)$.

Figure 4:
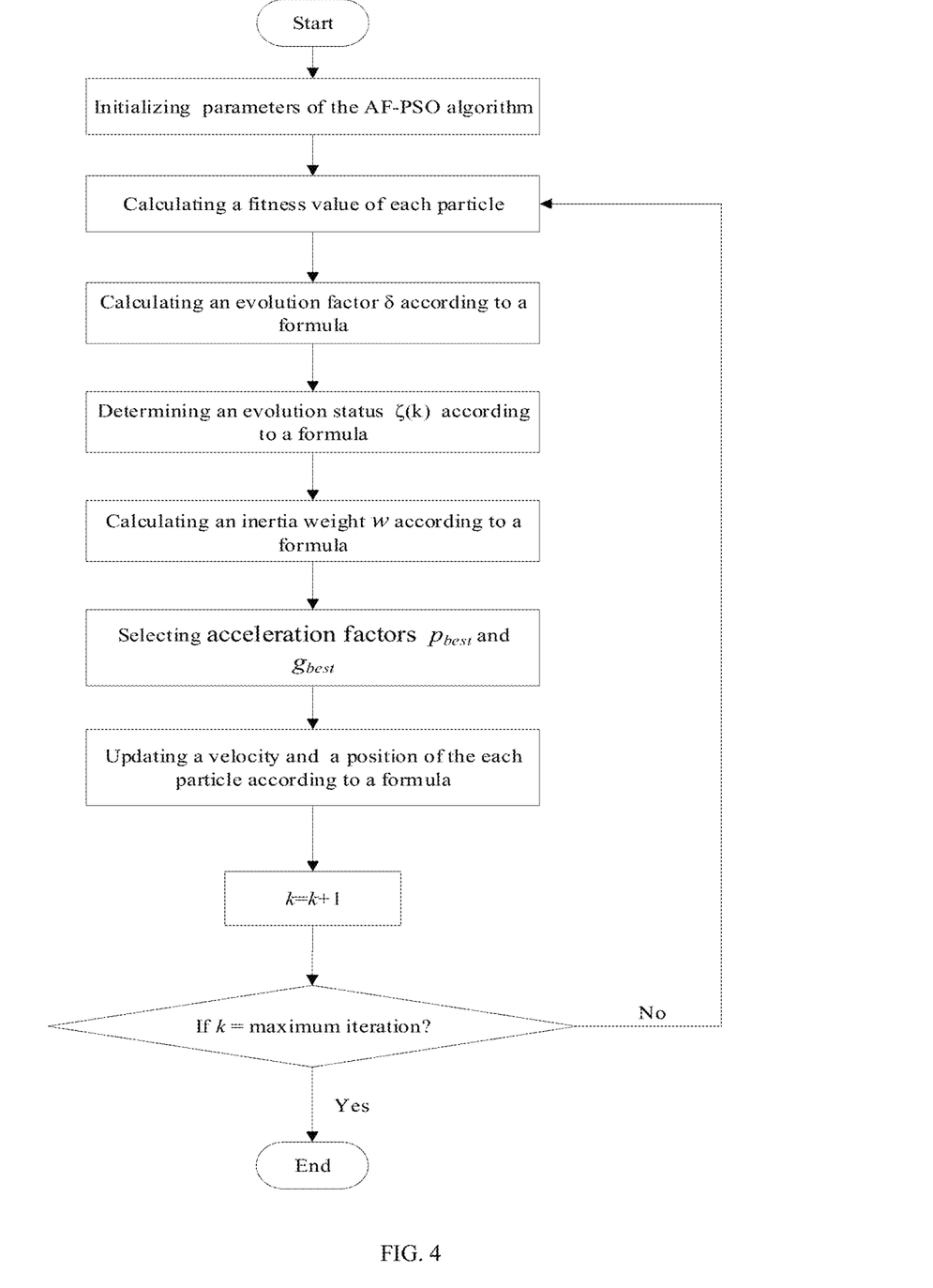
FIG. 4 is a flow chart of the AF-PSO hybrid algorithm according to an embodiment of the present invention.

Embodiment 2: as shown in FIG. 4, an adaptive focusing (AF)-particle swarm optimization (PSO) hybrid algorithm is provided. Firstly, the relevant parameters of the AF-PSO algorithm are initialized to calculate the fitness value of each particle;

Secondly, the acceleration factor δ is calculated by the following formula:

$$\delta = \frac{d_g - d_{min}}{d_{max} - d_{min}}$$

wherein, $d_g$ represents the center position of the all particles, $d_{max}$ represents the farthest from the center position and $d_{min}$ represents the shortest distance from the center position. Specifically, ζ(k) is defined as follows:

$$\zeta(k) = \begin{cases} 1 & 0 \leq \delta < 0.25 \\ 2 & 0.25 \leq \delta < 0.5 \\ 3 & 0.5 \leq \delta < 0.75 \\ 4 & 0.75 \leq \delta < 1 \end{cases}$$

Evolution status ζ(k) is determined by the above formula.

The inertial weight w is calculated by the following formula:

$$w = (w_1 - w_2) \times \frac{iter_{max} - iter}{iter_{max}} + w_2$$

wherein, $w_1$ and $w_2$ represent the initial value and the final value of the inertial weight w, respectively; and iter and $iter_{max}$ represent the current number of iterations and the maximum number of iterations, respectively.

Finally, the acceleration factor, the individual optimal position $p_{best}$ and the global optimal position $g_{best}$ are selected, and the velocity and the position of the particle is updated by the following formula:

(1) AF_prey (ζ(k)=1), wherein the velocity update model is as follows:

$$v_i(k+1) = wv_i(k) + c_1 r_1(p_i(k) - x_i(k)) + c_2 r_2(p_g(k) - x_i(k))$$

$$x_i(k+1) = x_i(k) + v_i(k+1)$$

All particles (fish) want to reach the global optimal position as quickly as possible, and when all particles reach the global optimal position, the individual optimal position $p_{best}$ of the particle coincide with the global optimal position $g_{best}$, that is, $p_{best} = g_{best} = x_i(k)$. Also because w is linear decrement, the final velocity $v_i(k+1) = 0$, it is implied that $x(k+1) = x(k)$ and all particles are located in the global optimal position.

(2) AF_swarm ($\delta(k)=2$), wherein the velocity update model is as follows:

$$v_i(k+1) = wv_i(k) + c_1 r_1 \frac{(p_i(k) - x_i(k))}{\|(p_i(k) - x_i(k))\|} + c_2 r_2 (p_g(k) - x_i(k))$$

$$x_i(k+1) = x_i(k) + v_i(k+1)$$

$\|(p_i(k)-x_i(k))\|$ represents a distance between the current position and the optimal position of the particle. When the particles enter the AF_swarm, the particles want to search closely for space near themselves. Because the particles tend to the global optimal position, so that $p_{best}$, $g_{best}$, and $x_i(k)$ are close to each other, and $v_i(k)=0$. But because of the introduction distance of the second item, the distance between the particles becomes smaller when the particle approaches the optimal position, that is $(p_i(k)-x_i(k))$ tends to 0. Because the distance is on the denominator, the whole item becomes larger, and therefore, $v_i(k+1)$ is not equal to 0, providing the velocity for particles to operate fine searching for space near themselves.

(3) The AF_follow ($\delta(k)=3$), wherein the velocity update model is as follows:

$$v_i(k+1) = wv_i(k) + c_1 r_1 (p_i(k) - x_i(k)) + c_2 r_2 \frac{(p_g(k) - x_i(k))}{\|(p_g(k) - x_i(k))\|}$$

$$x_i(k+1) = x_i(k) + v_i(k+1)$$

When particles enters the AFfollow, particles wants to further expand the search space, fearing that the searched global optimal position now is not actually optimal. Since particles tend to be globally optimal, $p_{best}$, $g_{best}$ and $x_i(k)$ are close to each other as $v_i(k)=0$. But because of the introduction distance of the third item, the distance between the particles becomes smaller when the particles approach the optimal position as $(p_i(k)-x_i(k))$ is close to 0, because the distance is on the denominator, the whole item becomes larger, and therefore, $v_i(k+1)$ is not equal to 0, providing the velocity for particles to operate fine searching for space near themselves.

(4) AF_random ($\delta(k)=4$), wherein velocity update model is as follows:

$$v_i(k+1) = wv_i(k) + c_1 r_1 \frac{(p_i(k) - x_i(k))}{\|(p_i(k) - x_i(k))\|} + c_2 r_2 \frac{(p_g(k) - x_i(k))}{\|(p_g(k) - x_i(k))\|}$$

$$x_i(k+1) = x_i(k) + v_i(k+1)$$

When particles enter AF_random, particles may fall into the local optimal state. Since the particles tend to be globally optimal, $p_{best}$, $g_{best}$ and $x_i(k)$ can be approximately considered to be a same value. But because of the introduction distance of the second and third items, particles approaches the optimal position as $(p_i(k)-x_i(k))$ and $(p_g(k)-x_i(k))$ are close to 0, and the distance between particles becomes smaller, because the distance is on the denominator, the whole item becomes larger, and therefore, $v_i(k+1)$ is not equal to 0, providing the velocity for particles to escape the local optimization.

The present invention uses the AF-PSO hybrid algorithm mentioned above to optimize the K-means algorithm as follows.

Step 1: the particle swarm is initialized by randomly selecting K center points from the sample as the initial value of the position of the particle, and meanwhile the velocity $v_i$, individual optimization $p_{best}$, global optimization $g_{best}$ of the particles are initialized.

Step 2: the cluster center that each data point belongs to is determined by the following formula.

A cluster problem can be described: a data set with n number of samples $x_i=(x_{i1}, x_{i2}, \ldots, x_{id})$ is given, wherein $i=1, 2, \ldots, n$, the data set is turned into k classes as follows:

$$X = C_1 \cup \ldots \cup C_k \cup C_{outliers}$$

wherein $C_1 \ldots C_k$ represents k classes. If the clusters do not overlap, then $C_i \cup C_j = \emptyset$.

Step 3: the fitness value of each particle is calculated according to the formula (2):

$$\sqrt{\sum_{i=1}^{d}(x_i - y_i)^2}$$

wherein $x_i$ and $y_i$ are the two points in the d-dimensional Euclidean space, respectively.

The present invention uses Mean Square Error (MSE) as the clustering objective function as follows:

$$MSE = \frac{1}{n} \sum_{j=1}^{k} \sum_{y_i \subseteq c_j} \|y_i - z_j\|^2$$

wherein, $z_j$ represents the cluster center.

Step 4: the fitness value of each particle is compared with the optimal position of the particles, and if the fitness value of each particle is similar to the optimal position of the particles, the current value is taken as the optimal position of the particles. All current $p_{best}$ and $g_{best}$ are compared with each other, and $g_{best}$ is updated.

Step 5: the velocity and the position of all particles are adjusted according to formulas (4-7).

(1) AF_prey ($\zeta(k)=1$), wherein the velocity update model is as follows:

$$v_i(k+1) = wv_i(k) + c_1 r_1 (p_i(k) - x_i(k)) + c_2 r_2 (p_g(k) - x_i(k))$$

$$x_i(k+1) = x_i(k) + v_i(k+1)$$

All particles (fish) want to reach the global optimal position as quickly as possible, and when all particles reach the global optimal position, the individual optimal position $p_{best}$ of the particle coincide with the global optimal position $g_{best}$, that is, $p_{best} = g_{best} = x_i(k)$. Also because w is linear decrement, the final velocity $v_i(k+1)=0$, it is implied that $x(k+1) = x(k)$ and all particles are located in the global optimal position.

(2) AF_swarm ($\delta(k)=2$), wherein the velocity update model is as follows:

$$v_i(k+1) = wv_i(k) + c_1 r_1 \frac{(p_i(k) - x_i(k))}{\|(p_i(k) - x_i(k))\|} + c_2 r_2 (p_g(k) - x_i(k))$$

$$x_i(k+1) = x_i(k) + v_i(k+1)$$

$\|(p_i(k)-x_i(k))\|$ represents a distance between the current position and the optimal position of the particle. When the particles enter the AF_swarm, the particles want to search closely for space near themselves. Because the particles tend to the global optimal position, so that $p_{best}$, $g_{best}$, and $x_i(k)$ are close to each other, and $v_i(k)=0$. But because of the introduction distance of the second item, the distance between the particles becomes smaller when the particle approaches the optimal position, that is $(p_i(k)-x_i(k))$ tends to 0. Because the distance is on the denominator, the whole item becomes larger, and therefore, $v_i(k+1)$ is not equal to 0, providing the velocity for particles to operate fine searching for space near themselves.

(3) The AF_follow ($\delta(k)=3$), wherein the velocity update model is as follows:

$$v_i(k+1) = wv_i(k) + c_1 r_1 (p_i(k) - x_i(k)) + c_2 r_2 \frac{(p_g(k) - x_i(k))}{\|(p_g(k) - x_i(k))\|}$$

$$x_i(k+1) = x_i(k) + v_i(k+1)$$

When particles enters the AF_follow, particles wants to further expand the search space, fearing that the searched global optimal position now is not actually optimal. Since particles tend to be globally optimal, $p_{best}$, $g_{best}$ and $x_i(k)$ are close to each other as $v_i(k)=0$. But because of the introduction distance of the third item, the distance between the particles becomes smaller when the particles approach the optimal position as $(p_i(k)-x_i(k))$ is close to 0, because the distance is on the denominator, the whole item becomes larger, and therefore, $v_i(k+1)$ is not equal to 0, providing the velocity for particles to operate fine searching for space near themselves.

(4) AF_random ($\delta(k)=4$), wherein velocity update model is as follows:

$$v_i(k+1) = wv_i(k) + c_1 r_1 \frac{(p_i(k) - x_i(k))}{\|(p_i(k) - x_i(k))\|} + c_2 r_2 \frac{(p_g(k) - x_i(k))}{\|(p_g(k) - x_i(k))\|}$$

$$x_i(k+1) = x_i(k) + v_i(k+1)$$

When particles enter AF_random, particles may fall into the local optimal state. Since the particles tend to be globally optimal, $p_{best}$, $g_{best}$ and $x_i(k)$ can be approximately considered to be a same value. But because of the introduction distance of the second and third items, particles approaches the optimal position as $(p_i(k)-x_i(k))$ and $(p_g(k)-x_i(k))$ are close to 0, and the distance between particles becomes smaller, because the distance is on the denominator, the whole item becomes larger, and therefore, $v_i(k+1)$ is not equal to 0, providing the velocity for particles to escape the local optimization.

Step 6: Step 2-Step 5 are repeated until the end condition is met. If the end condition is established, coordinates of the cluster center of each class are output.

Step 7: the AFPSO algorithm is applied on the leakage detection of the petroleum pipeline.

To validate the cluster performance of the K-means algorithm based on the AF-PSO algorithm, the silhouette value of the K-means algorithm based on the AF-PSO algorithm is compared with the silhouette value of the K-means algorithm based on the particle swarm optimization (PSO) algorithm.

Figure 2:
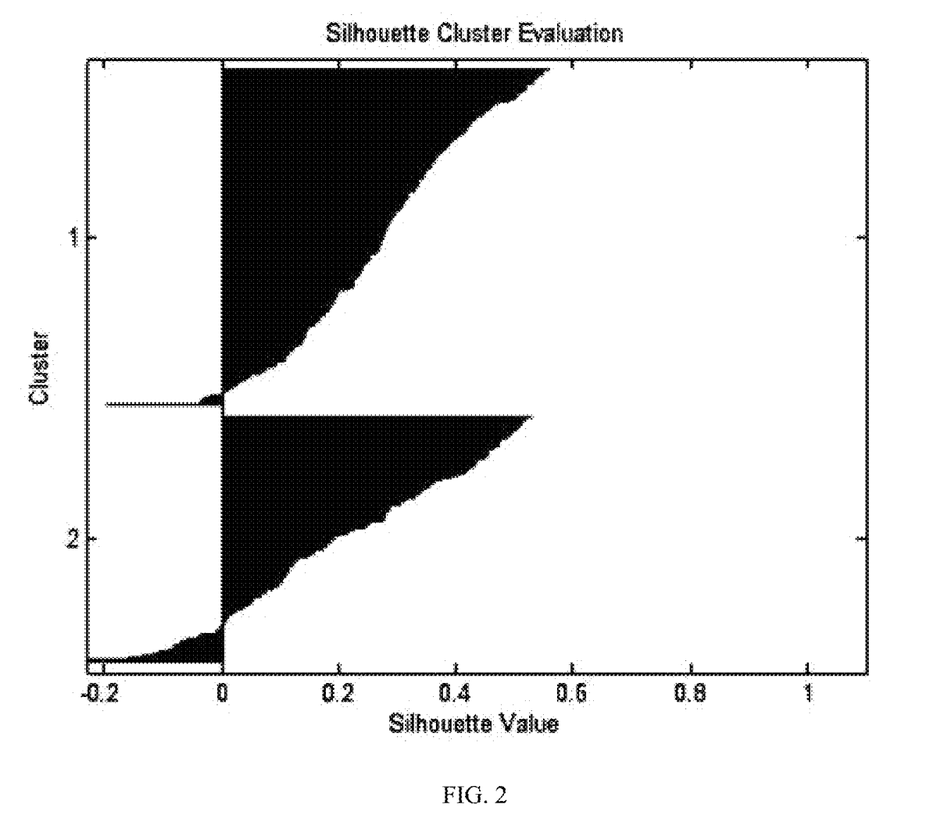
FIG. 2 is a diagram showing the silhouette values of the K-means algorithm based on the AF-PSO algorithm according to an embodiment of the present invention.
Figure 3:
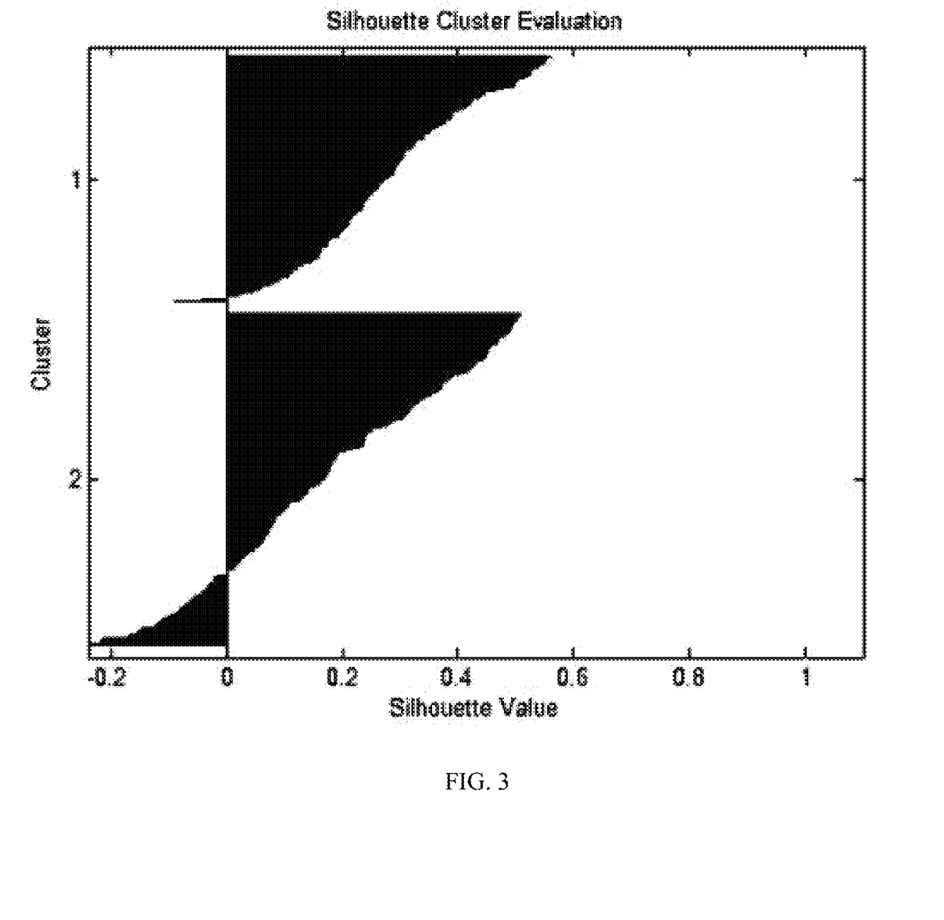
FIG. 3 is a diagram showing the silhouette values of the K-means algorithm based on the PSO algorithm according to an embodiment of the present invention.

The silhouette diagram of the K-means algorithm based on the AF-PSO algorithm and the silhouette diagram of the K-means algorithm based on the PSO algorithm are shown in FIG. 3 and FIG. 2. The average silhouette value of the K-means algorithm based on the AF-PSO algorithm is 0.2231 and the average silhouette value of the K-means algorithm based on the PSO algorithm is 0.2482. As shown in FIG. 2 and FIG. 3, the majority of the silhouette values of both algorithms, are positive, indicating that most of the data is assigned to the appropriate class. However, the average silhouette value of the K-means algorithm based on the AF-PSO algorithm in FIG. 2 is 0.2482, which is higher than the average silhouette value of the K-means algorithm based on the PSO algorithm. In addition, the negative silhouette values of the K-means algorithm based on the AF-PSO algorithm are less than that of the K-means algorithm based on the PSO algorithm, indicating that a relatively small amount of data points are assigned to inappropriate clusters. Finally, the number of leakage data is 13750, and the number of normal data is 9750, and a ratio of the number of leakage data to the number of normal data is approximately 1.41:1. The silhouette ratio in FIG. 3 meets 1.41:1. Thus, the advantages and feasibility of the K-means algorithm based on the AF-PSO algorithm and the reasonableness of the resulting classes have been validated.

Figure 5:
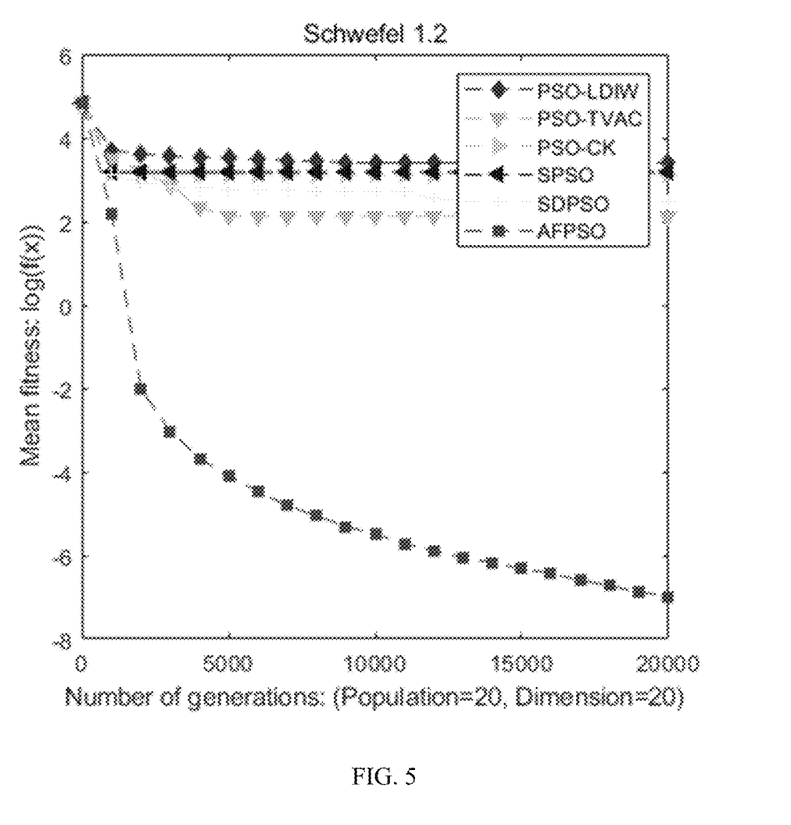
FIG. 5 is a diagram showing the performance test results of the Griewank function according to an embodiment of the present invention.

As shown in FIG. 5, the performance test of the Griewank function in FIG. 5 shows that the searching performance of the AF-PSO algorithm is superior to other classic algorithms (particle swarm optimization algorithm with a linearly decreased inertia weight (PSO-LDIW), particle swarm optimization algorithm with time-varying acceleration coefficients (PSO-TVAC), particle swarm optimization algorithm with the constriction factor (PSO-CK), switching particle swarm optimization (SPSO) algorithm, switching delayed particle swarm optimization (SDPSO) algorithm). As seen in the FIG. 5, the convergence performance of the AF-PSO algorithm is better than that of other algorithms and the mean fitness value of the AF-PSO algorithm is minimal, indicating that the AF-PSO algorithm can search global optimal value and effectively avoid local optimal value.

Embodiment 3: Based on the same invention concept, the present invention further provides a leakage detection system for a long petroleum pipeline based on AFPSO-K-means, including:

an initialization module, wherein the initialization module is configured to initialize the particle swarm and define the initial velocity and the initial position of each particle in the particle swarm;

a determination module, wherein the determination module is configured to determine the fitness value of each particle;

a traversing module, wherein the traversing module is configured to traverse the fitness value of each particle to obtain the optimal position corresponding to the fitness values of the individual particle and the global optimal position in the optimal fitness values of the particle swarm;

an iteration updating module, wherein the iteration updating module is configured to iteratively update the velocity and the position of each particle based on the optimal position corresponding to the fitness value of the individual particle; and a position determining module, wherein when the distance from the position of each particle to the global optimal position of the particle swarm in the optimal fitness value is less than the preset threshold or the number of iterations reaches the preset value, the position determining module is configured to output the current iteration updated result to determine the actual leakage position of the petroleum pipeline.

Those skilled in the art should be noted that the embodiments of the present invention can be used as a method, system, or computer program product. Therefore, the present invention can take the form of a complete hardware embodiment, a complete software embodiment, or a combination embodiment of software and hardware. Moreover, the present invention can take the form of one or more computer program product implemented on one or more computer usable storage media (including but not limited to disk memory, compact disc read-only memory (CD-ROM), optical memory, etc.) containing the program code available to the computer.

The present invention is described by reference to the flow chart and/or block diagram of the method, equipment (system), and computer program product of the embodiments It should be understood that each process in the flowchart and/or each block in the block diagram, and the combination of processes in the flowchart and/or blocks in the block diagram, can be implemented by a computer program instruction. These computer program instructions can be provided to general-purpose computers, specialized computers, embedded processors or other programmable data-processing devices to produce a machine, so that the instructions are executed by a computer or a processor of other programmable data-processing device to produce a device that achieve the specific function in one process or multiple processes in the flow chart and/or one block or multiple blocks in the block diagram.

These computer program instructions can also be stored in computer-readable memory that directs the computer or other programmable data-processing devices to operate in a specific manner, so that the instructions stored in the computer-readable memory produce a manufacturing product that includes an instruction device. The instruction device implements the specific function in one process or multiple processes in the flow chart and/or one block or multiple blocks in the block diagram.

These computer program instructions can also be loaded on computers or other programmable data-processing device, allowing a series of steps to be performed on computers or other programmable device to produce computer-implemented process, thus the instructions are executed on a computer or other programmable device to achieve the specific function in one process or multiple processes in the flow chart and/or one block or multiple blocks in the block diagram.

Finally, it should be noted that the above embodiments are only the description of the technical solution of the present invention and are not limited to the scope of protection of the present invention. Although the present invention is described in detail in conjunction with the above embodiments, those having ordinary skill in the art should understand that those having ordinary skill, after reading the description of the present invention, can still make changes, modifications or equivalent replacements in the embodiments, and such changes, modifications and equivalent replacements shall fall within the scope of protection of the claims.

What is claimed is:

1. A leakage detection method for determining a leakage position of petroleum from a petroleum pipeline based on adaptive focusing particle swarm optimization (AFPSO)-K-means, the method comprising:
   initializing a particle swarm, and defining an initial velocity and an initial position of each particle in the particle swarm, the step of initializing the particle swarm and defining the initial velocity and the initial position of each particle in the particle swarm comprising:
   defining a number of sample points of the particles of the particle swarm in the petroleum pipeline to be n;
   detecting the n sample points of the particles of the particle swarm in the petroleum pipeline;
   constructing a data set of the n sample points $x_i=(x_{i1}, x_{i2}, \ldots, x_{id})$; wherein i=1, 2, . . . , n;
   determining, by a computer processor, a fitness value of each particle based on the data set;
   traversing, by the computer processor, the fitness value of each particle to obtain an optimal position corresponding to the fitness value of each particle and a global optimal position in optimal fitness values of the particle swarm, the step of traversing the fitness value of each particle to obtain the optimal position corresponding to the fitness value of each particle and the global optimal position in the optimal fitness values of the particle swarm comprising:
   taking, by the computer processor, a minimum mean square error as a clustering objective function, and solving the clustering objective function to obtain a cluster center;
   obtaining, by the computer processor, the optimal position corresponding to the fitness value of each particle according to the cluster center; and
   obtaining, by the computer processor, the global optimal position in the optimal fitness values of the particle swarm by comparing the optimal fitness values of particles in the particle swarm;
   iteratively updating, by the computer processor, a velocity and a position of each particle based on the optimal position corresponding to the fitness value of each particle;
   when a distance from the position of each particle to the global optimal position in the optimal fitness values of the particle swarm is less than a preset threshold or a number of iterations reaches a preset value, outputting, by the computer processor, a current iteration updated result; and
   determining, by the computer processor, an actual leakage position on the petroleum pipeline based on the updated result.

2. The method according to claim 1, wherein the step of initializing the particle swarm and defining the initial velocity and the initial position of each particle in the particle swarm comprises:
   averagely dividing the data set to be clustered into k classes, wherein each class is one particle swarm;
   randomly selecting the initial position and the initial velocity of each particle in the particle swarm; and then
   obtaining an individual extreme value and a global extreme value based on the initial position and the initial velocity of each particle.

3. The method according to claim 2, wherein the data set is clustered into the k classes as follows:

$$X=C_1\cup \ldots \cup C_k\cup C_{outliers}$$

wherein, $C_1 \ldots C_k$ represents the k classes, k represents a number of classes, and X represents a clustered data set, and wherein if the cluster centers do not overlap, then $C_i \cap C_j = \emptyset$, wherein $C_i$ represents the $i^{th}$ class and $C_j$ represents the $j^{th}$ class.

4. The method according to claim 2, wherein the fitness value of each particle is determined by the following formula:

$$\sqrt{\sum_{i=1}^{d}(x_i - y_i)^2}$$

wherein, $x_i$ and $y_i$ represents two points in a d-dimensional Euclidean space, respectively.

5. The method according to claim 1, wherein the cluster center is determined by the following formula:

$$MSE = \frac{1}{n}\sum_{j=1}^{k}\sum_{y_i \subseteq c_j}\|y_i - z_j\|^2$$

wherein, $y_i$ represents a fitness value of an $i^{th}$ particle, and $z_j$ represents the cluster center.

6. The method according to claim 1, wherein the step of iteratively updating the velocity and the position of each particle based on the optimal position corresponding to the fitness value of each particle comprises:

comparing the fitness value of each particle with the optimal position corresponding to the fitness value of each particle, and when the fitness value of each particle converges to the optimal position corresponding to the fitness value of each particle, taking a fitness value of a current particle in the particle swarm as an optimal position of the current particle;

updating a velocity of the current particle by the following formula:

$$v_i(k+1) = wv_i(k) + c_1 r_1(p_i(k) - x_i(k)) + c_2 r_2(p_g(k) - x_i(k))$$

$$x_i(k+1) = x_i(k) + v_i(k+1)$$

wherein, $\|(p_i(k) + x_i(k))\|$ represents a distance between a fitness value $x_i(k)$ of an $i^{th}$ particle and an optimal position $p_i(k)$ corresponding to the $i^{th}$ particle, and $v_i(k)=0$, $v_i(k)$ represents a velocity of the current particle at k moment.

7. The method according to claim 6, wherein the step of outputting the current iteration updated result comprises:

comparing optimal positions of all current individual particles with the global optimal position of the particle swarm, and when the optimal positions of all the current individual particles reach the global optimal position, the optimal positions $p_{best}$ of the current individual particles coincide with the global optimal position $g_{best}$, $p_{best} = g_{best} = x_i(k)$ and $v_i(k+1)=0$, $x(k+1) = x(k)$.

* * * * *